United States Patent [19]

Schulz

[11] Patent Number: 5,288,399

[45] Date of Patent: Feb. 22, 1994

[54] GRAVITY FLOW FILTER WITH BACKWASH CONTROL CHAMBER

[76] Inventor: Christopher R. Schulz, 4909 Magdalene Ct., Annandale, Va. 22003

[21] Appl. No.: 936,835

[22] Filed: Aug. 28, 1992

[51] Int. Cl.⁵ .................. B01D 24/14; B01D 24/46
[52] U.S. Cl. ............................ 210/108; 210/126; 210/275; 210/278
[58] Field of Search ............... 210/98, 108, 109, 110, 210/111, 134, 264, 275, 277, 278, 793, 794, 798, 123, 125, 126, 127, 128, 425, 426, 427

[56] References Cited

U.S. PATENT DOCUMENTS

| | | | |
|---|---|---|---|
| 625,508 | 5/1899 | Hyatt | 210/275 |
| 719,357 | 1/1903 | McClintock | 210/125 |
| 3,134,735 | 5/1964 | Greenleaf, Jr. | 210/264 |
| 3,282,432 | 11/1966 | Greenleaf, Jr. | 210/264 |
| 3,682,307 | 8/1972 | Cook et al. | 210/123 |
| 4,946,600 | 8/1990 | Shin | 210/275 |
| 5,032,294 | 7/1991 | Schulz | 210/795 |

OTHER PUBLICATIONS

Brochure entitled, "Greenleaf Filter Control," pub. by Infilco Degremont Inc., dated Mar. 1976.

Brochure entitled "GFC CenTROL Multicell Gravity Filters," pub. by General Filter Company, 1980.
"Design Options for Water Filtration," by Robert D. G. Monk, Journal AWWA, Sep. 1987, pp. 93–106.

Primary Examiner—Joseph W. Drodge
Attorney, Agent, or Firm—Nies, Kurz, Bergert & Tamburro

[57] ABSTRACT

A gravity flow, single or multi-cell filter incorporating an integral backwash control chamber for enabling backwashing to occur without the need for backwash pumps. The backwash control chamber contains a volume of backwash liquid, and communicates with a source of pressurized backwash liquid through a float-controlled flow control valve in order to maintain a desired liquid level within the backwash control chamber during backwashing operations. The flow of backwash liquid from the backwash control chamber is controllable either by means of three-way valves interconnecting the backwash control chamber with the filter outlet chamber, or by wash water control gates within the backwash chamber that are adapted to selectively cover outlet openings to permit backwash flow to enter the filter outlet chamber.

12 Claims, 5 Drawing Sheets

GRAVITY FLOW FILTER WITH BACKWASH CONTROL CHAMBER

BACKGROUND OF THE INVENTION

1. Field of the Invention

The present invention relates to a gravity flow filter system incorporating one or more filter beds for filtering particulate matter from liquids, such as water for a municipal water supply, and including a self-contained backwash flow arrangement not requiring backwash pumps. More particularly, the present invention relates to a filter system in which a separate backwash chamber is provided within a main vessel structure for maintaining a quantity of backwash liquid for gravity flow of backwash liquid for periodic backwashing of the filter.

2. Description of the Related Art

Gravity flow filters having a plurality of filter cells for filtering liquids, such as water for municipal water supply systems, are well known. One example of such a filtering arrangement is illustrated and described in U.S. Pat. No. 3,134,735, which issued on May 26, 1964, to J. W. Greenleaf, Jr. That patent discloses a multiple cell filter system having an integral backwash arrangement including an external backwash channel. In that regard, the inventor discloses an arrangement involving a siphon-controlled backwash technique, which is disclosed in conjunction with a separate, but similar inlet siphon.

Another form of gravity filter incorporating multiple filter cells is disclosed in my U.S. Pat. No. 5,032,294, which issued on Jul. 16, 1991. That patent discloses a structural arrangement in which a centrally located effluent control chamber is provided, with provisions for backwashing with filtered water from adjacent filter cells or through the operation of a pumping system incorporating a motor-driven pump.

Although the prior art devices function reasonably well in their intended environments, it is desirable to provide a gravity filter system that can be readily used in rural areas, as well as in developing countries. Consequently, it is desirable to provide such a systems in which the need for backwash pumps, rate controllers, air compressors, and the like, is preferably minimized as much as possible, and possibly even eliminated, to reduce the dependence of the system upon outside power sources, and also to minimize the need for repair and maintenance of such ancillary equipment.

It is an object of the present invention to provide an improved gravity flow filter arrangement in which an integral, gravity-based backwashing arrangement is provided.

SUMMARY OF THE INVENTION

Briefly stated, in accordance with one aspect of the present invention, a gravity flow liquid filter is provided in the form of a vessel that includes an inlet for feeding into the vessel liquid to be filtered, and an outlet to convey filtered liquid from the vessel One or more filter cells are positioned within the vessel for receiving the liquid to be filtered, each filter cell including a filter bed and having a filtered liquid outlet communicating with the vessel outlet.

A backwash chamber is provided and is in communication with the filter cell, the backwash chamber being so positioned to provide a backwash liquid level at a higher elevation than liquid within the filter cell, to permit gravity flow of backwash liquid from the backwash chamber to the filter cell.

A backwash liquid flow control valve communicates with the backwash chamber for providing to the backwash chamber backwash liquid from a source of pressurized backwash liquid. The backwash liquid source can be a high-service pumping station, an elevated backwash tank, or the like. The backwash flow control valve is operatively connected with a liquid level sensor that is, in turn, responsive to a backwash liquid level within the backwash chamber for maintaining a desired level of backwash liquid within the backwash chamber. A backwash flow conduit extends between the backwash chamber and the filter cell, the backwash flow conduit including a flow control valve for selectively controlling flow of backwash liquid between the backwash chamber and the filter bed for permitting backwash liquid to flow through the filter bed in a reverse direction relative to flow through the filter bed of liquid to be filtered during a filtering operation. A drain conduit extends from the vessel for receiving backwash flow after the backwash flow has passed through the filter bed, for conveying the backwash flow to a drain line.

DESCRIPTION OF THE PREFERRED EMBODIMENTS

Figure 1:
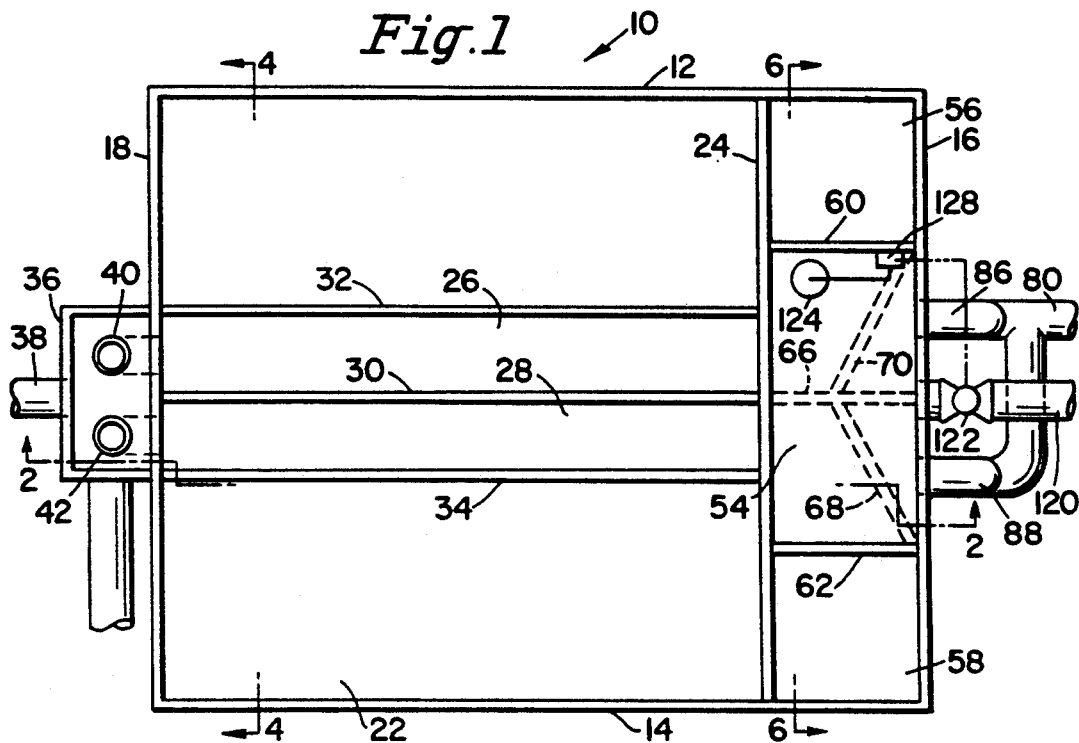
FIG. 1 is a top plan view of a gravity flow filter system including a filter vessel having a backwash control chamber in accordance with the present invention.

Referring now to the drawings, and particularly to FIG. 1 thereof, there is shown a top plan view of a filter vessel 10 of generally rectangular cross section. Vessel 10 includes a pair of opposed, substantially parallel side walls 12, 14, and a pair of opposed, substantially parallel end walls 16, 18 that are disposed perpendicularly relative to side walls 12, 14. The spacings between side walls 12, 14 and end walls 16, 18, are dependent upon the volumetric rate of flow of the liquid to be treated.

Within vessel 10 are a pair of filter cells 20, 22 of generally rectangular cross section Filter cells 20, 22 extend longitudinally along respective side walls 12 and 14 and have a longitudinal length defined by the spacing between vessel end wall 18 and filter cell end wall 24, between end walls 16 and 18. Positioned between filter cells 20, 22 are a pair of side-by-side washwater gullets 26, 28 that are separated longitudinally by a central divider wall 30 that extends from vessel end wall 18 to filter cell end wall 24. The respective innermost filter cell side walls 32, 34 define overflow weirs over which backwash water passes from each of filter cells 20, 22 into washwater gullets 26, 28, respectively, during a backwash event, as will be hereinafter explained. The vertical heights of the respective weirs defined by filter cell side walls 32, 34 are substantially less than the vertical height of central divider wall 30.

Positioned on the exterior face of end wall 18 of vessel 10 is an inlet chamber 36 that is positioned adjacent the ends of washwater gullets 26, 28. An inlet pipe 38 conveys unfiltered water to inlet chamber 36, and a pair of inlet drop pipes 40, 42 (see FIG. 3) extend vertically from a point within inlet chamber 36 downwardly to respective three-way valves 44, 46. The uppermost edges of inlet drop pipes 40, 42 define respective circular weirs, that establish the maximum liquid level C (see FIG. 2) within vessel 10 at the end of a filter operating cycle, as will be hereinafter explained.

Drain lines 48, 50 extend downwardly from respective three-way valves 44, 46 to a drain collector pipe 52. Also extending from three-way valves 44, 46, inwardly into vessel 10 and communicating with wash water gullets 26, 28, are respective inlet connector pipes 54, 55 (see FIG. 1). For larger filter installations and for higher flow rates, three-way inlet valves 44, 46 can each be replaced by standard isolation valves (not shown), one such isolation valve positioned in each of inlet drop pipes 40, 42 and one each in drain lines 48, 50.

Figure 6:
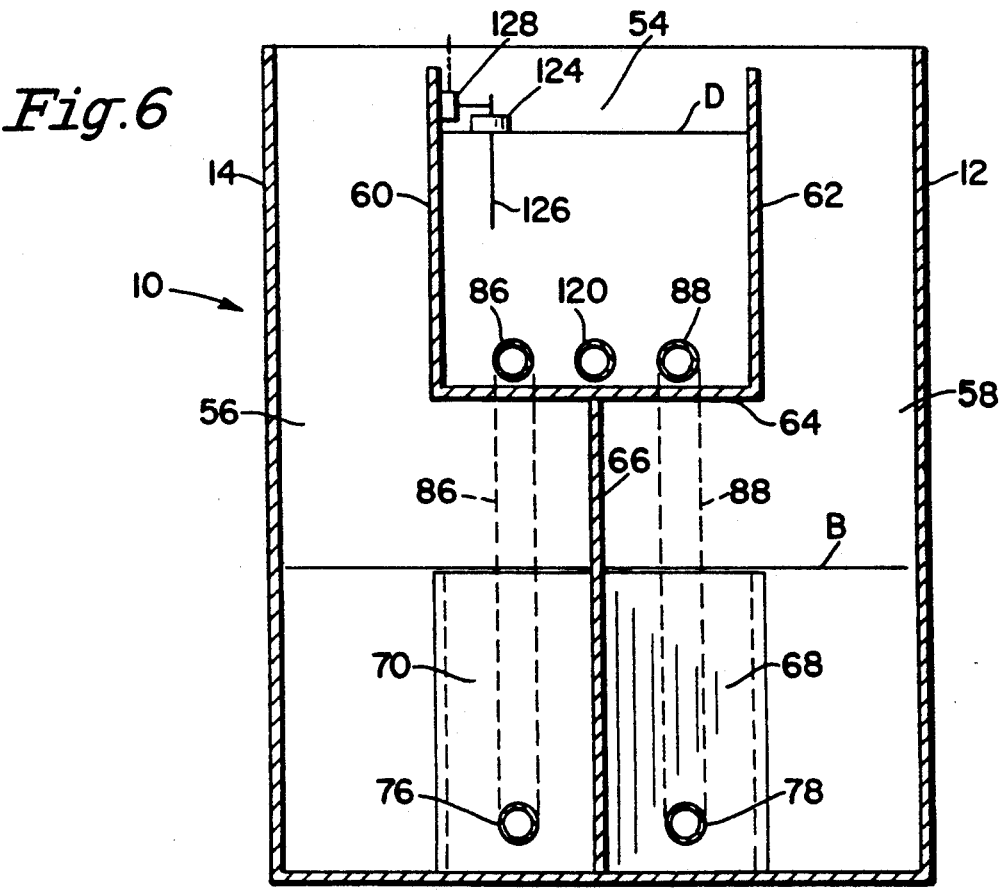
FIG. 6 is a vertical cross-sectional view of the filter vessel of FIG. 1, taken along the line 6—6 thereof.

Referring once again to FIG. 2, at the opposite end of vessel 10 from inlet chamber 36, and within the walls of vessel 10, is a backwash chamber 54 in the upper portion of the vessel. As best seen in FIG. 6, on either side of and below backwash chamber 54 are respective filter outlet chambers 56, 58. Backwash control chamber 54 is defined by filter cell end wall 24 and vessel end wall 16 in the longitudinal direction of vessel 10, and by a pair of vertically extending, spaced side walls 60, 62 in the transverse direction. The vertical height of backwash chamber 54 is defined by a base wall 64 that extends between filter cell end wall 24 and vessel end wall 16, and that is vertically supported by a longitudinal extension 66 of central divider wall 30.

Figure 8:
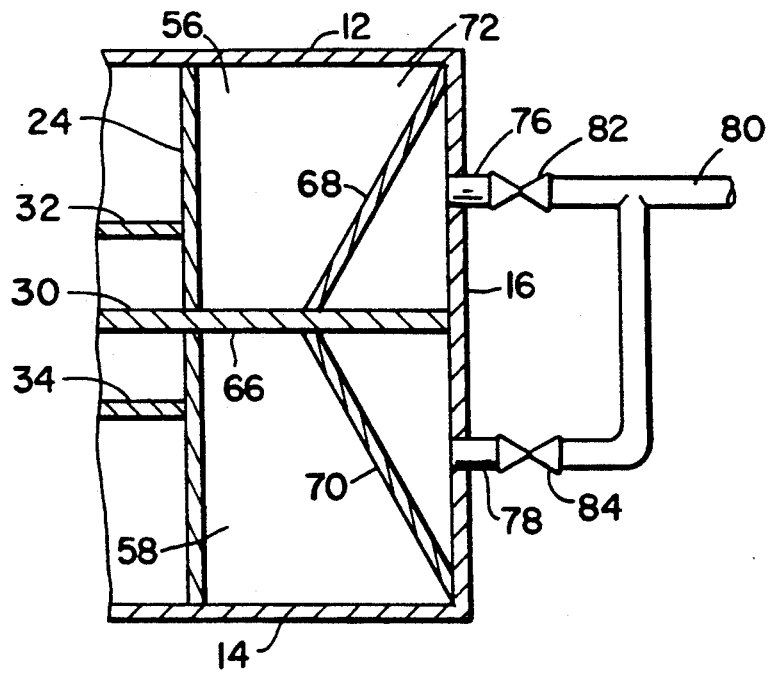
FIG. 8 is a fragmentary, cross-sectional plan view of the filter vessel shown in FIG. 2, taken along the line 8—8 thereof.

Referring now to FIG. 8, filter outlet chambers 56, 58 each include a respective outlet weir 68, 70 that is angularly disposed with respect to vessel end wall 16, and that separates the major portions of each of filter outlet chambers 56, 58 from respective outlet collection chambers 72, 74. Extending from outlet collection chambers 72, 74 and through vessel end wall 16 are a pair of chamber outlet conduits 76, 78 that communicate with a common outlet pipe 80 through respective three-way outlet valves 82, 84.

Figure 5:
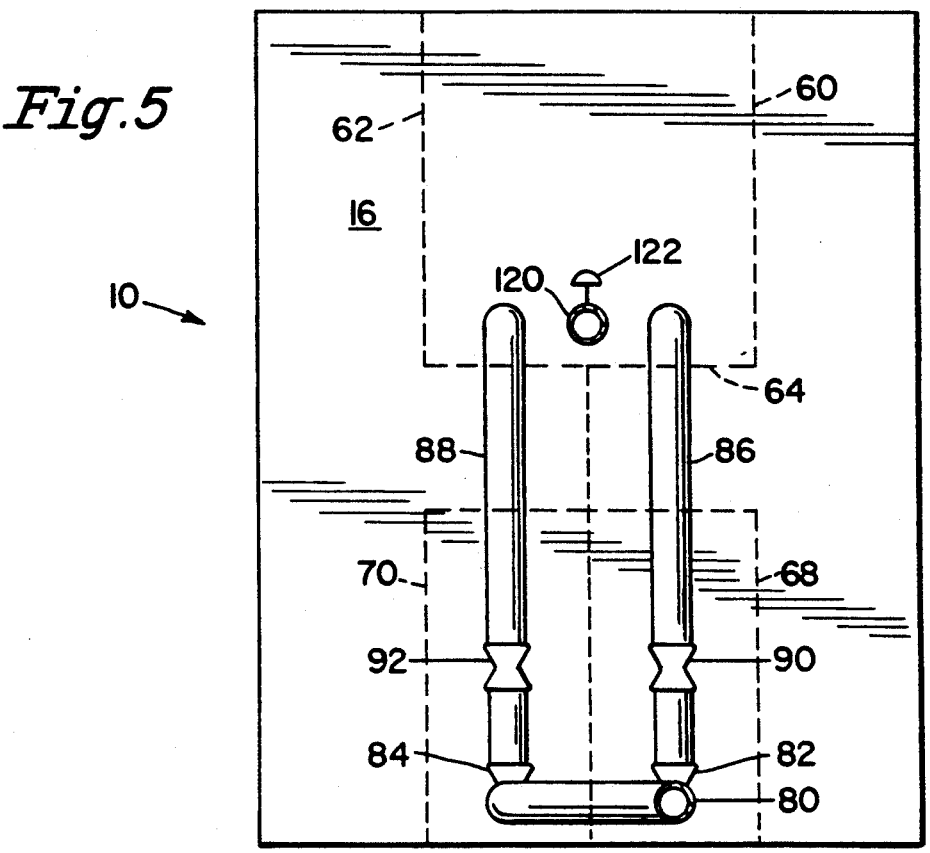
FIG. 5 is a right end view of the filter vessel shown in FIG. 1.

Referring now to FIG. 5, also connected with three-way outlet valves 82, 84 are respective washwater drop pipes 86, 88 that extend upwardly from the valves and through vessel end wall 16 to communicate with the interior of backwash chamber 54. Washwater drop pipes 86, 88 each include a flow meter 90, 92, respectively, having a self-contained flow indicator (not shown) to permit proper adjustment of the associated three-way outlet valve to maintain a desired washwater flow rate, as will be hereinafter explained. For larger filter installations and for higher flow rates, three-way valves 82, 84 could each be replaced by standard isolation valves (not shown), one such isolation valve positioned in each of outlet conduits 76, 78 and others positioned in each of washwater drop pipes 86, 88.

Figure 2:
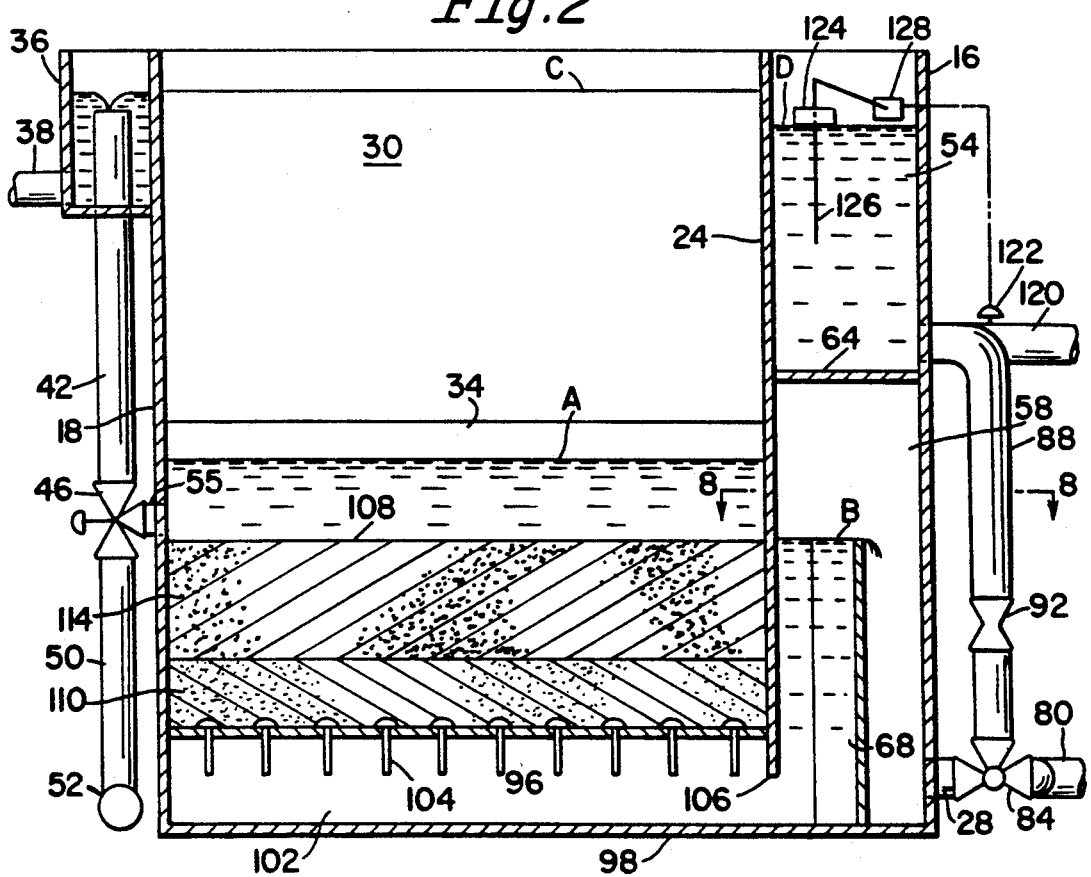
FIG. 2 is a vertical cross-sectional view of the filter of FIG. 1, taken along the line 2—2 thereof.
Figure 3:
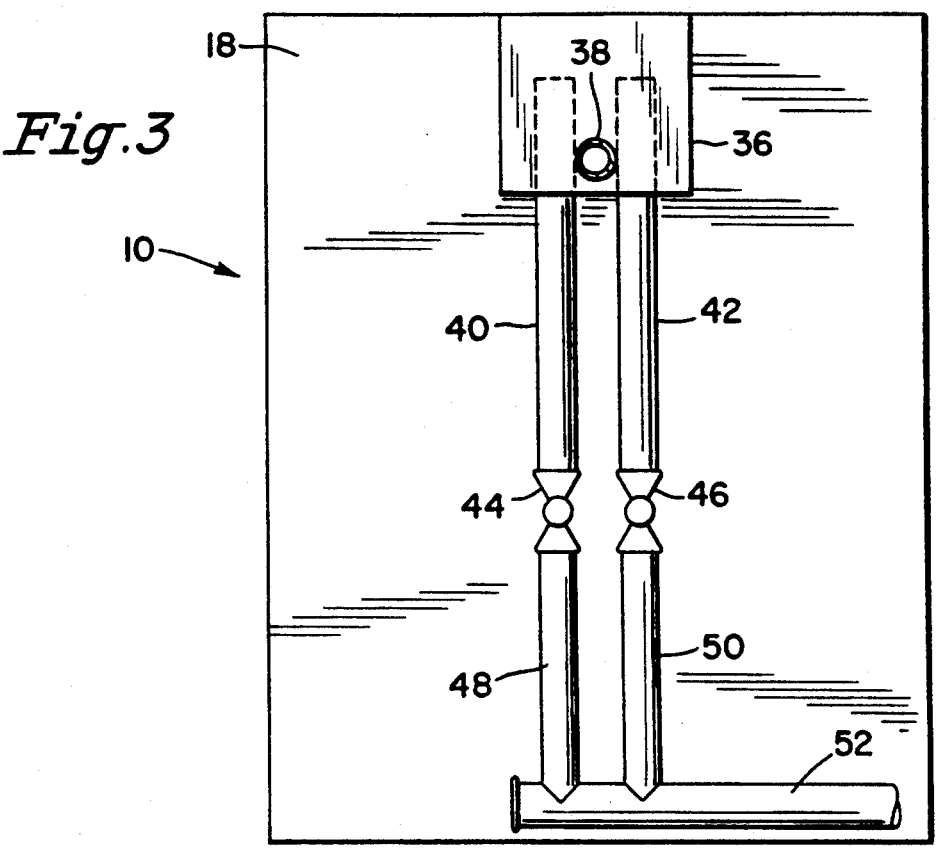
FIG. 3 is a left end view of the filter vessel shown in FIG. 1.
Figure 4:
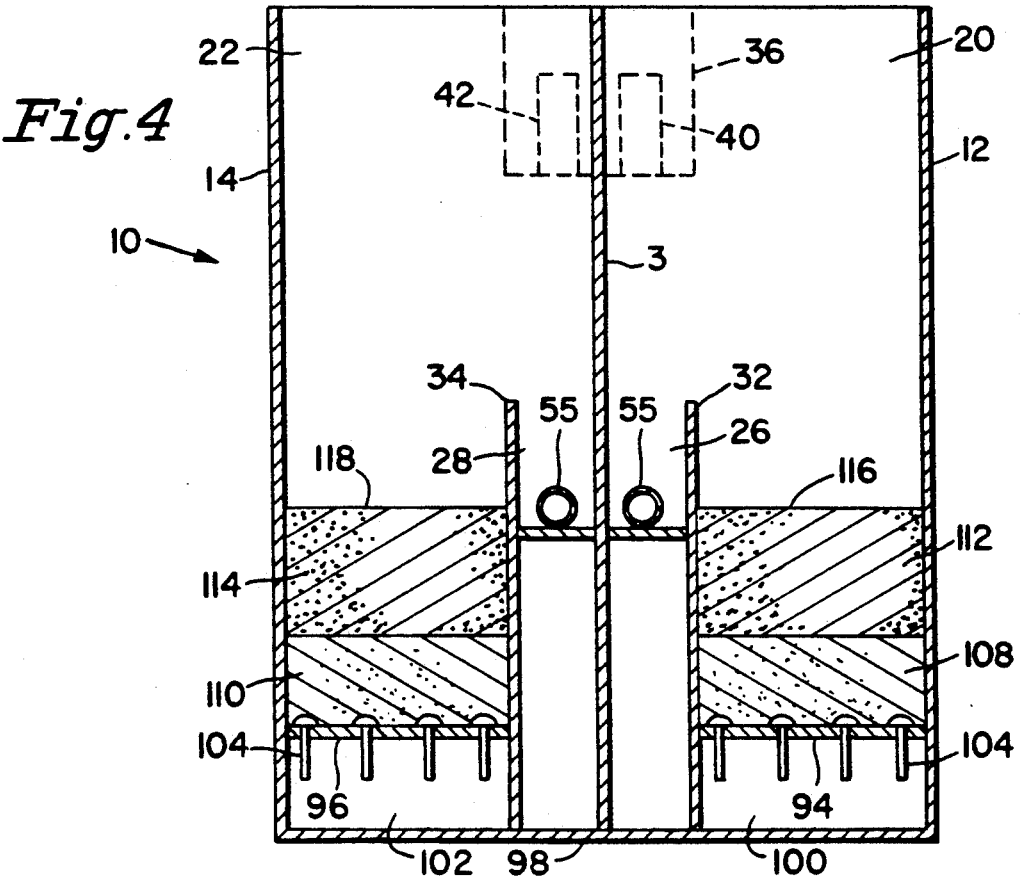
FIG. 4 is a vertical cross-sectional view of the filter vessel shown in FIG. 1, taken along the line 4—4 thereof.

Filter cells 20 and 22 are each configured in the same way, and they each include the same elements. Referring now to FIGS. 2 and 4, filter cell 20 and 22 each include a respective underdrain panel 94, 96 that is spaced upwardly from the vessel bottom wall 98 to define respective underdrain plenums 100, 102. A plurality of underdrain nozzles 104 extend vertically through underdrain panels 94 and 96 to provide communication between filter cells 20, 22 and their respective underdrain plenums 100, 102. Underdrain panels 94, 96 each extend between vessel end wall 18 and filter cell end wall 24. The latter extends completely across vessel 10 between side walls 12 and 14, but as shown in FIG. 2 its lowermost edge 106 is spaced above bottom wall 96 to define an underdrain submerged weir.

Referring once again to FIG. 4, above underdrain panels 94, 96 are positioned first layers 108, 110 of a fine filter medium, preferably in the form of a plurality of relatively small particles, such as fine sand, or the like. Immediately above first layers 108, 110 are respective second layers 112, 114 of a relatively coarse filter media, preferably in the form of a plurality of particles that are larger than the particles defining first layer 104, such as coarse anthracite coal, as will be appreciated by those skilled in the art. Second layers 112, 114 each extend upwardly within respective filter cells 20, 22 to levels 116, 118 that are appreciably below the levels of respective filter side walls 32 and 34 to permit the filter layers to expand vertically during a backwashing event, as will be hereinafter explained.

Figure 7:
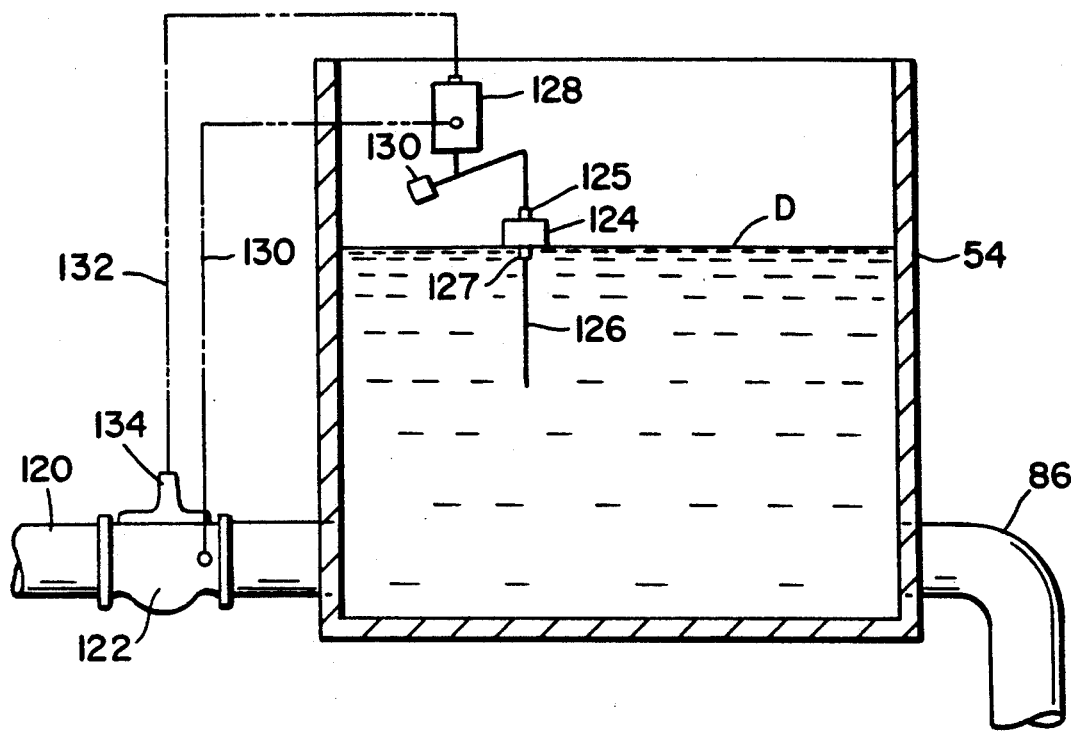
FIG. 7 is an enlarged, fragmentary view, partially in cross section, of the backwash control chamber of the filter vessel shown in FIG. 1.

As shown in FIGS. 1 and 2, a washwater feed pipe 120 extends from a pressurized source (not shown) of filtered washwater, and communicates with backwash chamber 54 through a diaphragm-type washwater flow control valve 122. Referring now to FIG. 7, in which washwater feed pipe 120 and washwater drop pipe 86 are shown on opposite sides of backwash chamber 54 for purposes of clarity, backwash chamber 54 includes a float 124 that is movable along a float rod 126. Set screws 125, 127 are provided to secure float 124 to rod 126 in order to maintain a predetermined liquid level (E) within backwash chamber 54. Float 124 is operatively connected with a float control pilot valve 128, and a float counterweight 130 is provided to balance the weight of float 124. An inlet control line 132 extends from valve cover chamber 134 to pilot valve 128 and a drain line 130 extends from pilot valve 128 to the discharge side of washwater control valve 122. Float 124 and pilot valve 128 operate together with washwater control valve 122 to maintain a desired level of backwash liquid within backwash chamber 54.

In operation during a filter cycle, unfiltered water is supplied to vessel 10 through inlet pipe 38 and flows into inlet chamber 36 to rise to the level of inlet weirs defined by the uppermost ends of the respective inlet drop pipes 40, 42. The positions of three-way inlet valves 44, 46 during the filtration operation are such as to permit flow from inlet drop pipes 40, 42 into washwater gullets 26, 28, respectively, and to simultaneously close off the respective drain lines 48, 50. As the unfiltered water enters washwater gullets 26 and 28 it fills the gullets and then overflows filter cell sidewalls 32, 34 to enter a respective one of filter cells 20 and 22, rising initially to level A. Because the flow within and out of the respective filter cells is the same, the ensuing description will be based upon the flow through filter cell 22, with the understanding that the unfiltered water entering filter cell 20 undergoes the same treatment and passes through corresponding elements of the filter vessel structure.

The water passes downwardly within filter cell 22 into and through second layer 114, the coarse filter medium, and then into and through first layer 110, the fine filter medium. From first layer 110 the filtered water passes through underdrain nozzles 104 to enter underdrain plenum 102 and then passes below underdrain submerged weir 106 and into outlet chamber 58 at the upstream side of outlet weir 70. The filtered water then passes over outlet weir 70 and into chamber outlet conduit 78 to flow through three-way outlet valve 84 and into outlet pipe 80 where the flow is discharged into a clearwell for distribution to users.

The differences in unfiltered and filtered water levels (A-B) represent the required pressure head to drive the water through the clean filter media following a backwash event. As the filtering operation continues, the filter media gradually become clogged with impurities removed from the water and, at the same time, the water level in filter cell 22 gradually rises in order to maintain sufficient pressure to drive the water through the filter media at a constant rate. When the level of water within either filter cell rises to maximum level C, filtration is temporarily terminated by turning three-way inlet valves 44 o 46 to provide communication between washwater gullets 26 or 28 and respective drain lines 48 or 50, which simultaneously stops the flow of inlet water from inlet drop pipes 40 and 42 and drops the water level in filter cells 20, 22 to the top edge of sidewalls 32 or 34. The filter cells must then be cleaned to permit filtration to resume.

Both filter cells 20, 22 are cleaned in the same manner, and the ensuing description will be based upon a backwash event through filter cell 22. Preferably, the filter cells should be backwashed one at a time so that one filter can continue to provide treatment while the other filter is being cleaned. The cleaning of filter cell 22 is effected using washwater that is contained within backwash chamber 54 by shifting three-way outlet valve 84 to provide communication between washwater drop pipe 88 and outlet connector 78, thereby closing off outlet pipe 80. Washwater from backwash chamber 54 enters outlet chamber 58 on the downstream side of outlet weir 62. The backwash water level floods weir 62 and continues to rise in outlet chamber 58 until it reaches a level just below the water level in backwash chamber 54. The washwater then passes in a reverse flow direction and under underdrain submerged weir 106 to enter underdrain plenum 102.

Because of the elevation difference between the operating water level in backwash chamber 5 and the level of the overflow weir defined by filter cell sidewall 34, washwater flows upwardly from underdrain plenum 102 through underdrain nozzles 104 into and through the respective filter media layers and up and over the overflow weirs to enter washwater gullet 28. Because three-way inlet valve 46 is open to permit flow from washwater gullet 28 into drain line 50, the washwater containing the backflushed particulate material passes through three-way inlet valve 46, which then serves as a drain valve, to enable the washwater to pass through drain line 50 and into drain pipe 52.

As the backwash operation proceeds, washwater that leaves backwash chamber 54 is replaced by washwater that enters through washwater feed pipe 120 and washwater flow control valve 122. In that regard, float 124 and float control pilot valve 128 control the position of washwater flow control valve 122 to permit washwater to enter backwash chamber 54 as necessary to maintain a predetermined, desired washwater liquid level D, as shown in FIG. 7.

The rate of backwashing can be controlled by suitably positioning the control lever on three-way outlet valves 82, 84 to provide either a slow or a rapid backwash flow. In that regard, the rate of flow can be monitored by visually checking the indicators on flow meters 90 and 92, and the position of the valve members in three-way outlet valves 82, 84 can be adjusted to maintain the desired backwash flow rate.

After the backwash operation is completed, the system can be returned to its filtration mode of operation by first shifting the valve elements in three-way outlet valves 82 84 to block flow from backwash chamber 54 and to permit flow from outlet chambers 56, 58 to outlet pipe 80. Three-way inlet valves 44, 46 are then adjusted to prevent flow through drain lines 48, 50 and to permit flow from inlet drop pipes 40, 42 into washwater gullets 26, 28, whereupon the flow through the apparatus proceeds to filter the inlet flow from inlet pipe 38.

Figure 9:
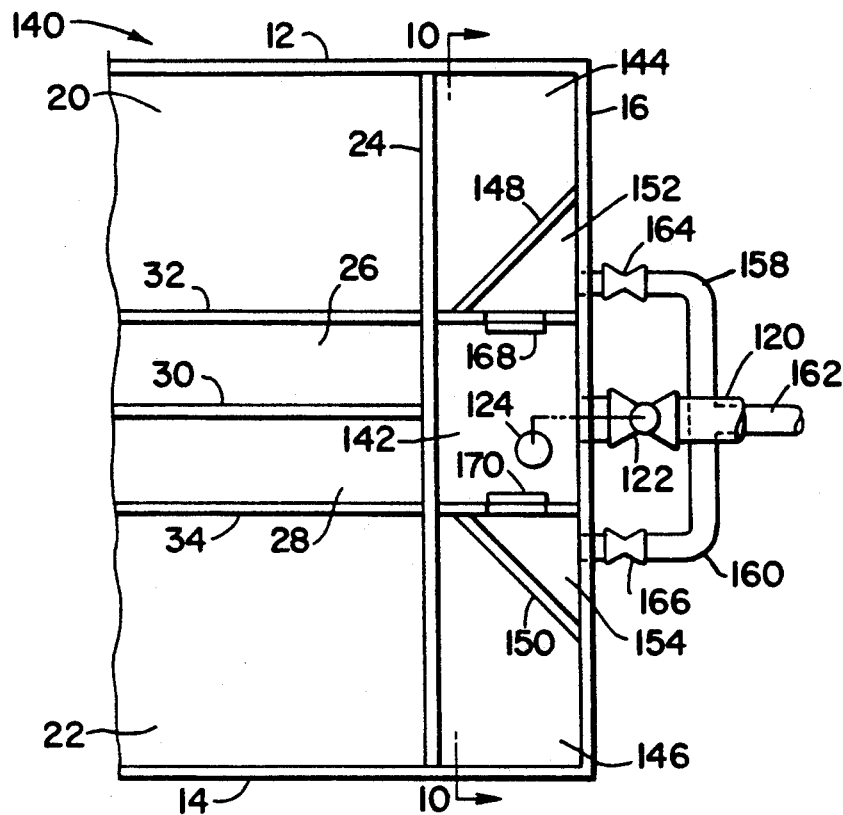
FIG. 9 is a fragmentary, top plan view of an alternate embodiment of a filter vessel in accordance with the present invention, showing an alternative arrangement for the backwash chamber.
Figure 10:
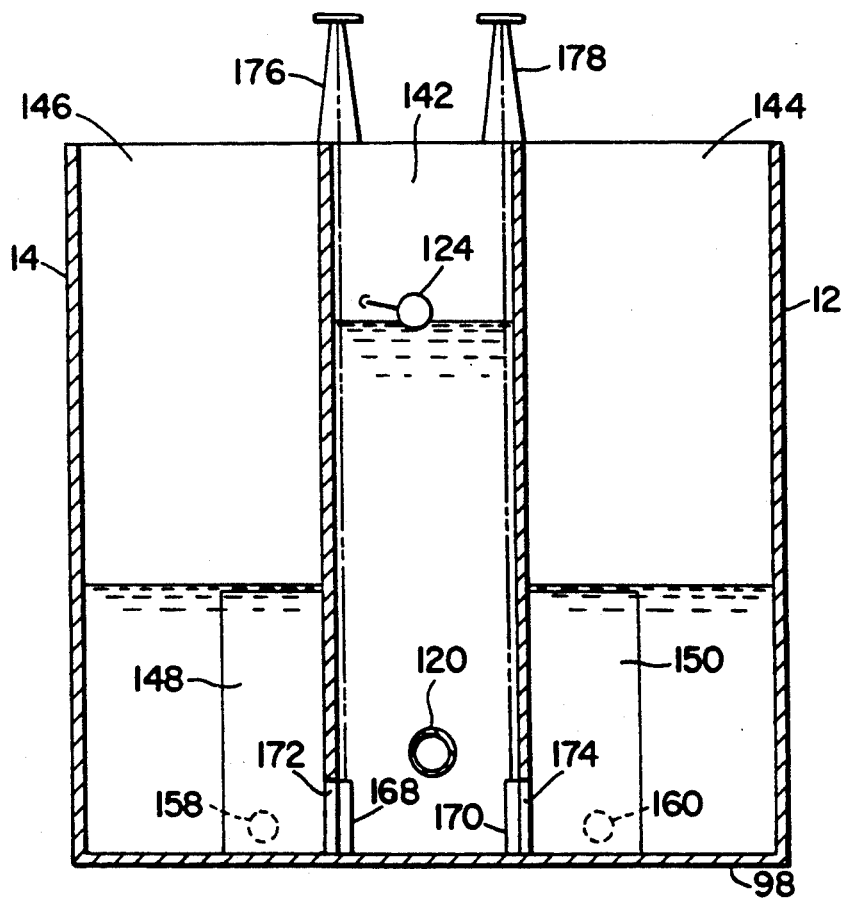
FIG. 10 is a vertical cross-sectional view of the filter vessel of FIG. 9, taken along the line 10-10 thereof

Another embodiment of the gravity filter of the present invention is shown in FIGS. 9 and 10, wherein elements having the same structure and function as corresponding elements in the embodiment shown in FIGS. 1 through 8 are identified with the same reference numerals. FIG. 9 shows a fragmentary top plan view of the outlet end of a filter vessel 140 that has a similar structure as that of vessel 10 in FIGS. 1 through 9, except that the FIG. 9 embodiment includes a differently configured backwash chamber 142 and differently configured filter outlet chambers 144, 146.

Between filter cell end wall 24 and vessel end wall 16 are three side-by-side, vertically extending chambers, a central backwash chamber 142 on each side of which is a filter outlet chamber 144, 146. Each of filter outlet chambers 144, 146 includes a respective outlet weir 148, 150 that extends upwardly from base 98 of vessel 140 to substantially the elevation of the top surface of the filter media in filter cells 20 and 22, as in the previously-described embodiment of the invention. The portions of filter outlet chambers 144, 146 on the upstream sides of outlet weirs 148, 150 contain the filtered water that has passed through the filter cells, and the downstream portions, relative to outlet weirs 148, 150, which define respective small antechambers 152, 154, that communicate with respective outlet conduits 158, 160, to empty into an outlet pipe 162. Each of outlet conduits 158, 160 includes a respective outlet flow control valve 164, 166, to isolate outlet pipe 162 from filter vessel 140 during a backwashing operation.

A washwater feed pipe 120 extends from a pressurized source of filtered washwater to backwash chamber 142, and a backwash flow control valve 122 is controlled, as in the previously-described embodiment, by a float operated pilot valve to regulate the flow of washwater that enters backwash chamber 142. Float 124 is positioned within backwash chamber 142 and is operatively connected with backwash flow control valve 122, through the pilot valve, to maintain a desired level of backwash liquid within backwash chamber 142.

As best seen in FIG. 10, adjacent the bottom of backwash chamber 142, and within the confines of the backwash chamber, are a pair of washwater flow control gates 168, 170 that are of generally rectangular form to selectively close and open respective flow outlets 172, 174 from backwash chamber 142. Flow outlets 172, 174 communicate with respective filter outlet chambers 144 and 146. Washwater flow control gates 168, 170 are manually operated by means of respective washwater control gate operators 176, 17B that are positioned at the uppermost portion of vessel 140 for convenient access.

In the operation of the alternative embodiment of FIGS. 9 and 10, the operation of the filtration phase of the apparatus is identical with that for the previously-described embodiment. The backwash cycle is similar, except that it involves more manual control operations for the backwash phase. Specifically, the washwater flow rate is controlled by the raising or lowering of the backwash control gate, which, in turn, increases or decreases the open area of flow outlets 170, 172. An operator can make minor adjustments to the backwash flow rate based upon visual observations of the water level in each of the filter outlet chambers.

It will be apparent to those skilled in the art that the present invention as herein illustrated and described provides distinct advantages over the prior art arrangements. In that connection, the filter permits filtering and backwashing operations for smaller filters to be controlled by means of only two three-way valves for each filter cell. For larger filters, only four two-way valves are required for each filter cell. Additionally, the first-described embodiment permits control of the backwash flow rate by controlling the three-way or the two-way valves in the outlet line, whereas in the second-described embodiment the backwash flow rate is achieved by modulating the position of the backwash gate. The present invention is especially adapted for use in connection with water treatment plants for use in rural areas and in underdeveloped countries.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the present invention.

What is claimed is:

1. A gravity flow, liquid filter comprising:
   a) a vessel including a liquid inlet conduit for conducting unfiltered liquid from a source of unfiltered liquid to the vessel, and a liquid outlet conduit for conducting filtered liquid from the vessel to a downstream clearwell;
   b) a filter cell positioned within the vessel for receiving liquid to be filtered that enters the vessel through the liquid inlet, the filter cell including a filter bed and having a liquid outlet communicating with the vessel outlet;
   c) a backwash chamber in communication with a source of filtered backwash liquid and with the filter cell, the backwash chamber positioned to provide a backwash liquid level at a higher elevation than liquid within the filter cell to permit gravity flow of the backwash liquid from the backwash chamber to the liquid outlet of the filter cell to flow through the filter cell in a reverse direction relative to flow of unfiltered liquid through the filter cell to clean the filter cell of accumulated filtrate material during a filter cell backwash operation;
   d) a first backwash liquid flow control valve communicating with the backwash chamber for providing backwash liquid from a pressurized backwash liquid source to the backwash chamber, the backwash flow control valve operatively connected with a liquid level sensor responsive to a backwash liquid level within the backwash chamber for maintaining a desired level of backwash liquid within the backwash chamber;
   e) a second backwash flow conduit extending between the backwash chamber and the liquid outlet of the filter cell, the backwash flow conduit including a backwash flow control valve for selectively controlling the rate of flow of backwash liquid from the backwash chamber to the filter cell for permitting backwash liquid to flow through the filter cell during a backwash operation in a reverse direction relative to flow through the filter bed of liquid to be filtered during a filtering operation; and
   f) a drain conduit extending from the vessel for receiving backwash liquid after the backwash liquid has passed through the filter bed and for conveying the backwash flow to a drain line.

2. A gravity flow, liquid filter in accordance with claim 1 wherein the vessel includes at least one additional filter cell operatively connected with a unitary backwash chamber.

3. A gravity flow, liquid filter in accordance with claim 2 wherein the backwash chamber is within the filter vessel.

4. A gravity flow, liquid filter in accordance with claim 2 including one liquid channel per filter cell positioned between the filter cells for receiving backwash liquid from the filter cells for conveying the backwash liquid to the drain conduit during a backwash phase of operation of the filter.

5. A gravity flow, liquid filter in accordance with claim 4 including a flow control weir positioned between each respective liquid channel and filter cell.

6. A gravity flow, liquid filter in accordance with claim 1 including an inlet flow control valve positioned in the liquid inlet conduit for selectively providing communication between a source of unfiltered liquid and the filter cell when the inlet flow control valve is in a first position, and for providing communication between the filter cell and a drain pipe when the inlet flow control valve is in a second position.

7. A gravity flow, liquid filter in accordance with claim 1 wherein an outlet flow control valve is positioned between the backwash liquid chamber and the filter cell and between the filter cell and the fluid outlet conduit to selectively provide communication between the backwash chamber and the filter cell when the outlet flow control valve is in a first valve position and is positioned between the filter cell and the liquid outlet conduit to provide communication between the filter cell and the liquid outlet conduit when the outlet flow control valve is in a second valve position.

8. A gravity flow, liquid filter in accordance with claim 1 wherein the fluid level sensor is a float and the float is connected with a pilot valve that is operatively connected with the first backwash liquid flow control valve for maintaining a desired liquid level within the backwash chamber.

9. A gravity flow, liquid filter in accordance with claim 8 wherein the pilot valve is responsive to a position of the level sensor for controlling the rate of backwash liquid flow through the first backwash liquid flow control valve.

10. A gravity flow, liquid filter in accordance with claim 1 wherein the backwash chamber includes a backwash flow control gate for selectively permitting communication between the backwash chamber and the filter cell.

11. A gravity flow, liquid filter in accordance with claim 10 wherein the backwash flow control gate is operable by a manual gate operator apparatus positioned on the vessel.

12. A gravity flow, liquid filter in accordance with claim 10 wherein the backwash flow control gate is operable by a motor-driven gate operator apparatus positioned on the vessel.

* * * * *